United States Patent
Braz Ferreira (10) Patent No.: US 11,725,750 B2
(45) Date of Patent: Aug. 15, 2023

(54) RECOVERING USED SUBSEA PIPELINES

(71) Applicant: Subsea 7 Limited, Sutton (GB)

(72) Inventor: Andre Braz Ferreira, Lisbon (PT)

(73) Assignee: Subsea 7 Portugal Limitada, Lisbon (PT)

( * ) Notice: Subject to any disclaimer, the term of this patent is extended or adjusted under 35 U.S.C. 154(b) by 7 days.

(21) Appl. No.: 17/627,593

(22) PCT Filed: Jul. 17, 2020

(86) PCT No.: PCT/EP2020/070355
§ 371 (c)(1),
(2) Date: Jan. 14, 2022

(87) PCT Pub. No.: WO2021/009372
PCT Pub. Date: Jan. 21, 2021

(65) Prior Publication Data
US 2022/0205557 A1    Jun. 30, 2022

(30) Foreign Application Priority Data

Jul. 18, 2019   (GB) ...................................... 1910289

(51) Int. Cl.
*F16L 1/16* (2006.01)
*F16L 1/20* (2006.01)

(52) U.S. Cl.
CPC .............. *F16L 1/166* (2013.01); *F16L 1/207* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,751,932 A | * | 8/1973 | Matthews, Jr. | F16L 1/166 294/102.1 |
| 5,188,483 A | * | 2/1993 | Kopp | F16L 1/20 405/173 |
| 8,381,578 B2 | * | 2/2013 | Sweeney | B63C 11/52 73/40 |

(Continued)

FOREIGN PATENT DOCUMENTS

| | | |
|---|---|---|
| EP | 2 683 974 | 11/2012 |
| GB | 1599311 A1 | 9/1981 |

(Continued)

*Primary Examiner* — Kyle Armstrong
(74) *Attorney, Agent, or Firm* — Levy & Grandinetti (57) ABSTRACT

A method of recovering a used pipeline from the seabed to the surface comprises attaching a recovery cap to the pipeline at the seabed to surround an end of the pipeline, and then upending at least an end portion of the pipeline underwater suspended beneath the recovery cap. While the upended pipeline is being lifted toward the surface, hydrocarbon contaminants rising buoyantly from the interior and walls of the pipeline are captured within the recovery cap, floating on water within and surrounding the pipeline. The captured contaminants are then conveyed from the recovery cap to a reservoir that is external to the recovery cap. The reservoir can be lifted toward the surface with the upended pipeline, for example, on a lifting line attached to the recovery cap. The reservoir can expand as it fills with contaminants and as hydrostatic pressure decreases, with gas from the contaminants being vented off.

30 Claims, 7 Drawing Sheets

(56) References Cited

U.S. PATENT DOCUMENTS

| | | | | |
|---|---|---|---|---|
| 8,708,038 B2* | 4/2014 | Tucker | ................ | E21B 43/0122 |
| | | | | 285/19 |
| 9,255,458 B2* | 2/2016 | Austin | .................. | E21B 19/002 |
| 9,534,479 B2* | 1/2017 | Austin | .................... | F16L 1/166 |

FOREIGN PATENT DOCUMENTS

| | | |
|---|---|---|
| GB | 2 258 030 | 1/1993 |
| WO | WO 2008/100943 | 8/2008 |
| WO | WO 2014/036092 | 3/2014 |
| WO | 2020/208353 A1 | 10/2020 |

\* cited by examiner

RECOVERING USED SUBSEA PIPELINES

This invention relates to the removal and recovery of subsea pipelines at the end of their working life, for example when a subsea oil and gas installation is being decommissioned. The invention relates particularly to the challenge of lifting a subsea pipeline toward the surface without allowing hydrocarbon contaminants to spill from the pipeline into the surrounding sea.

Most prior art relating to subsea pipeline recovery is specific to recovery during installation. The need for recovery arises when pipeline installation has been interrupted, for example due to bad weather. In that case, the pipeline end is abandoned to the seabed temporarily and is recovered to the surface later for installation to resume.

By way of example, GB 2258030 shows a recovery clamp that can be attached to a pipeline end before being lifted to the surface. Typically, the clamp and the pipeline are lifted on an abandonment and recovery (A&R) wire that is suspended from an A&R winch of a surface vessel. However, as an unused pipeline is still clean and so presents no risk of hydrocarbon spillage, prior art such as GB 2258030 relating to A&R operations during installation is irrelevant to the invention.

Conventional methods for decommissioning and removal of used pipelines involve firstly cleaning the interior of the pipeline and then lifting the pipeline to the surface. The pipeline can be cut into sections on the seabed that are lifted individually. Alternatively, one end of the pipeline can be lifted and used to pull the rest of the pipeline away from the seabed progressively, for example onto a reel aboard a surface vessel. Some examples of pipeline recovery methods are disclosed in EP 2683974.

The interior of a pipeline is typically cleaned by propelling pig trains along the internal bore of the pipeline to push along slugs of a cleaning fluid such as monoethylene glycol (MEG) and/or nitrogen and/or water. For example, in U.S. Pat. No. 3,751,932, a recovery cap comprises a gas inlet to propel a spherical pig and thus to clean a pipeline. The pig isolates the cap from the pipeline and contains fluid inside the pipeline.

Cleaning by pigging is not always possible or effective because some pipelines are difficult to pig. For example, there may be changes in the inner diameter of the pipeline, or the inner surface of the pipeline may be heavily corroded, or adjacent subsea structures may preclude the connection of a pig launcher or receiver.

Another problem is that whilst a pig can only clean the exposed inner surface of the pipeline, hydrocarbon contaminants can reside within the thickness of the surrounding pipeline wall. This problem arises particularly where the pipeline wall has a layered structure. For example, a rigid steel pipeline may have a polymer liner, in which case contaminants can leak into and migrate along the narrow annular interstitial space between the liner and the outer wall of the pipe. Additional challenges arise with a flexible pipeline, whose wall typically comprises multiple layers including a carcass, wire reinforcement and insulation layers. The multiple layers define multiple annular interstitial spaces in which leaked contaminants may lodge, out of reach of a cleaning pig.

Figure 1:
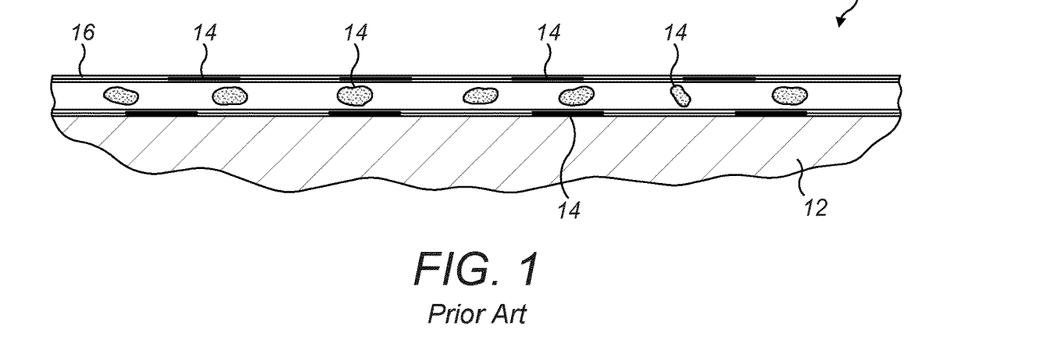
FIG. 1 is a schematic partial sectional side view of a contaminated flexible subsea pipeline lying on the seabed and ready for decommissioning.

Referring in this respect to FIG. 1, this schematic drawing shows a flexible subsea pipeline 10 lying on the seabed 12 in a horizontal orientation and ready for decommissioning at the end of its operational life. The pipeline 10 is drawn in longitudinal section to show hydrocarbon contaminants 14 such as oil or tar deposits adhering to the inner surface of the pipeline wall 16. Some such deposits may remain even after pigging.

The pipeline wall 16 has a layered structure. This defines annular interstitial spaces between the layers in which further hydrocarbon contaminants 14 are lodged. Thus, the layered pipeline wall 16 is flooded with contaminants 14 which, as noted above, cannot be removed by pigging. The interstitial spaces can also contain small bubbles or pockets of gas. Additionally, the hydrostatic pressure prevailing at depth will hold some gas in solution within any liquid contaminants 14.

Figure 2:
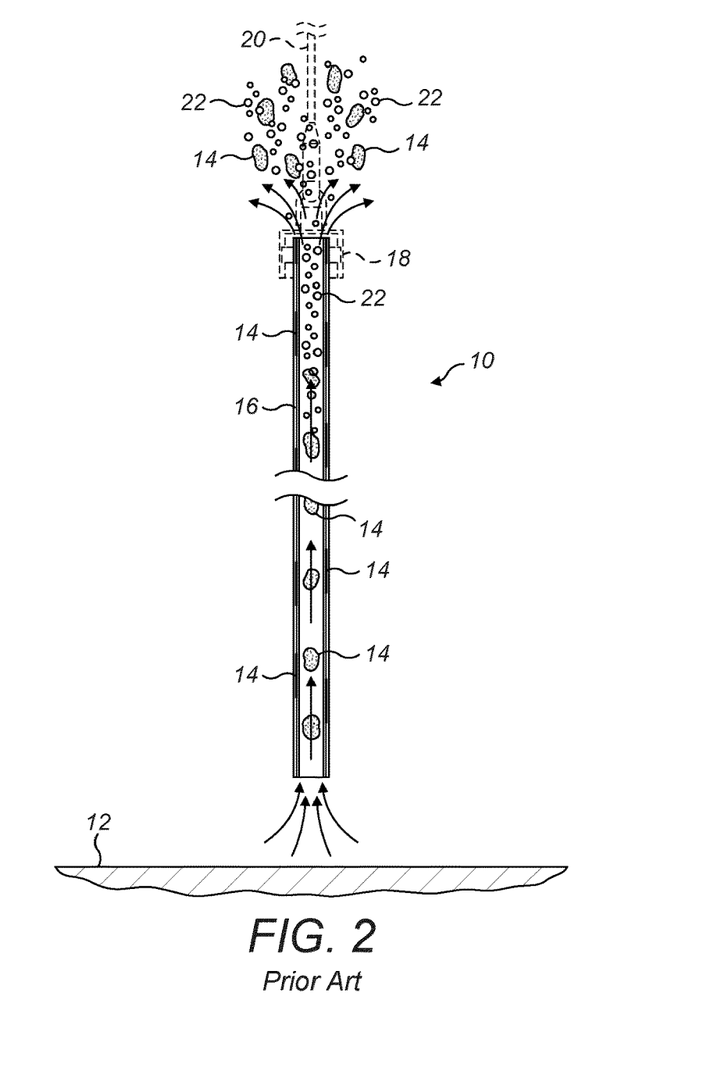
FIG. 2 is a schematic sectional side view of the pipeline of FIG. 1 fitted with a recovery cap of the prior art and lifted from the seabed in an upright orientation during decommissioning, initiating a chimney suction effect that has forced contaminants out of the pipeline and into the surrounding sea.

FIG. 2 shows, in dashed lines, a recovery cap 18 of the prior art that has been attached to an end of the pipeline 10. An A&R wire 20 acting on the recovery cap 18 has been used to lift at least a section of the pipeline 10 into an upright orientation in the water column above the seabed 12. In this example, the pipeline 10 is shown hanging straight in a substantially vertical orientation, with its lower end clear of the seabed 12. In other examples, a lower end of the pipeline 10 could still be lying on the seabed 12 before being lifted clear of the seabed 12; in that case, the pipeline 10 could be curved in a J-shape.

When an elongate pipeline 10 is lifted into an upright orientation in the water column, the ends of the pipeline 10 experience differential hydrostatic pressure. Specifically, hydrostatic pressure reduces by approximately one bar for every ten metres of the length of the pipeline 10 progressing upwardly. Thus, if the lower end of the pipeline 10 remains at or near to the seabed 12 and the upper end of the pipeline 10 is, say, 1000 m above the seabed 12, hydrostatic pressure close to the upper end of the pipeline 10 will be nearly one hundred bar lower than the hydrostatic pressure close to the lower end of the pipeline 10.

In accordance with Boyle's law, such a reduction in hydrostatic pressure approaching the upper end of the pipeline 10 allows a massive expansion in the volume of bubbles or pockets of gas trapped within the layered wall of the pipeline 10—ultimately, up to a hundred-fold. The expanding gases will include gas that comes out of solution from deposits of oil. The result, as shown in FIG. 2, is that bubbles and pockets of gas 22 expand and rise through the interior of the pipeline 10 and extend and migrate upwardly along annular gaps between the layers of the pipeline wall 16. The movement of gas 22 and the pressure exerted by its constrained expansion dislodges, propels and entrains the liquid contaminants 14 such as oil or tar that had flooded the layered wall of the pipeline 10. On reaching the upper end of the pipeline 10, the gas 22 and dislodged contaminants 14 are expelled from the pipeline 10 to surge into the surrounding seawater.

It will also be apparent from FIG. 2 that the upward outflow of gas 22 and contaminants 14 from the upper end of the pipeline 10 creates a chimney-like suction effect that draws in seawater at the lower end of the pipeline 10. The resulting upward flow of seawater along the length of the pipeline 10 also has the effect of flushing contaminants 14 from within the pipeline 10 and from between the layers of the pipeline wall 16.

Calculations based on a flexible pipeline with a 10" (25.4 cm) inner diameter show that nearly 5.5 litres of contaminants could be trapped inside the annular interstitial spaces of the layered wall for every metre length of the pipeline. Consequently, recovering a used pipeline that is, say, 1.5 km long has the potential to spill more than 8000 litres of oil into the sea. Clearly, such a spillage would be unacceptable.

To the uninitiated, it may appear that the obvious solution to the spillage problem would be to trap liquid contaminants inside the pipeline, including the layered wall of the pipeline. However, this would create a bigger and uncontrolled risk because the expansion of trapped gas would burst the pipeline wall, which would inevitably lead to a significant spillage and could cause injury and damage to nearby personnel and equipment.

Against this background, the invention resides in a method of recovering a used pipeline from an underwater location to the surface of a body of water. The pipeline may have a layered wall structure, such as an unbonded flexible pipeline. The method comprises: at the underwater location, attaching a recovery cap to the pipeline to surround an end of the pipeline; and upending at least an end portion of the pipeline underwater with the recovery cap on top. Then, while lifting the upended pipeline toward the surface, the method further comprises: capturing within the recovery cap hydrocarbon contaminants rising from the pipeline; and conveying the captured contaminants from the recovery cap to a reservoir.

At least the end portion of the pipeline may conveniently be suspended from the recovery cap. The reservoir may, for example, be spaced from the recovery cap and connected to the recovery cap by an elongate conduit such as a hose extending through water.

The captured contaminants may be conveyed to the reservoir when the reservoir is situated underwater or at or above the surface. In the former case, the reservoir may be expanded while the upended pipeline is being lifted toward the surface, and may be lifted toward the surface with the pipeline, for example when supported on a lifting wire attached to the recovery cap. Gas may be vented from the reservoir while the pipeline is being lifted toward the surface.

The captured contaminants may be propelled from the recovery cap to the reservoir by virtue of positive buoyancy of the contaminants relative to the water. It is also possible to pump the captured contaminants from the recovery cap to the reservoir.

The captured contaminants within the recovery cap may be floated on water within the pipeline and on water surrounding the pipeline. For example, the interior of the pipeline may be flooded with water from an end opposed to the end fitted with the recovery cap.

Sealing between the recovery cap and the pipeline may define a sealed chamber around the end of the pipeline. The captured contaminants may be confined to that chamber.

Correspondingly, the inventive concept embraces a recovery cap for recovering a pipeline from an underwater location to the surface of a body of water, the recovery cap comprising: a hollow body; an attachment interface for coupling the body to an end of the pipeline; and at least one port for extracting hydrocarbon contaminants from the body when an end portion of the pipeline is upended. The recovery cap may further comprise a lifting interface for a lifting line.

The attachment interface suitably comprises a clamp ring that is movable radially inwardly from a side wall of the body.

The port may be positioned in an upper portion of the body. The body may have an open bottom and a closed top, and may further comprise a circumferential seal encircling an inner surface of the body.

The inventive concept extends to a pipeline recovery system that comprises the recovery cap of the invention and a reservoir in fluid communication with the recovery cap.

The reservoir may be spaced apart from the recovery cap and so may be in fluid communication with the recovery cap via an elongate conduit.

The reservoir may comprise a submersible tank, which may be expansible or pressure-compensated and may comprise a gas vent. Conveniently, a submersible tank may be attached to a lifting wire that is also attached to the recovery cap. Alternatively, the reservoir may comprise an above-surface tank. In either case, a pump may be provided for pumping the contaminants from the recovery cap to the reservoir.

The invention allows a used pipeline that has been insufficiently cleaned or emptied of contaminants to be recovered to the surface while reducing the risk of spillage of the contaminants into the marine environment.

In summary, the system of the invention comprises a tank such as a flexible bladder in fluid communication with a lifting tool. This tank captures hydrocarbon fluids coming out from the annulus of a flexible pipe and releases gas, keeping contaminant liquid inside. The invention thereby addresses the problem of containing oil spilling from an open cut flexible pipe during its recovery to the surface. As the pipe is open at both ends, fluid contaminants inside the annulus can easily travel along the pipe and without the invention, can easily escape from the pipe into the surrounding sea.

The lifting tool holds an end portion of the pipe inside a cylinder that will capture and temporarily hold liquid and gas leaking from the pipe. The cylinder is connected to the tank via a hose or other conduit that conveys the liquid and gas to the tank.

Thus, by taking advantage of environmental conditions and physics, the spillage containment system of the invention captures hydrocarbon liquid and gas escaping from the annulus of a flowline during flowline recovery and holds the liquid in a tank. The tank may comprise a segregation system and/or a pressure-actuated valve that discharges the gas from the tank, leaving only the contaminant liquid inside.

Embodiments of the invention provide a recovery cap for mounting at an end of a subsea pipeline such as an unbonded flexible pipeline. The recovery cap comprises: a body; an interface to be coupled to the pipeline end; an interface for a lifting cable, such as a hook, a padeye or a shackle; and at least one port and hose for extracting fluids from the top of the body when the pipeline is substantially vertical.

The hose may be fluidly connected to a bladder, which may itself be mounted on the lifting cable. Alternatively, the hose may be fluidly connected to a storage tank at the surface.

Embodiments of the invention also implement a method for recovering residual fluids in a pipeline during recovery, the method comprising the following steps: coupling a recovery cap to a first pipeline end, the recovery cap comprising a body, a lifting interface, an interface with the pipeline and an outlet; connecting the outlet to a hose and to a storage device; connecting a lifting wire to the recovery cap; and lifting the recovery cap and the pipeline with the wire so that fluids inside the pipeline are evacuated to the storage device. The storage device may, for example, be mounted on the lifting wire.

The remote pipeline end may be cut or otherwise opened to the sea for free flooding by water, in which case hydrocarbon fluids will float on that water up to the recovery cap.

Thus, the invention provides techniques for recovering a used pipeline from the seabed to the surface, comprising attaching a recovery cap to the pipeline at the seabed to surround an end of the pipeline, and then upending at least an end portion of the pipeline underwater suspended beneath the recovery cap. While lifting the upended pipeline toward the surface, hydrocarbon contaminants rising buoyantly from the interior and walls of the pipeline are captured within the recovery cap, floating on water within and surrounding the pipeline.

The captured contaminants are then conveyed from the recovery cap to a reservoir that is external to the recovery cap. The reservoir may be lifted toward the surface with the upended pipeline, for example on a lifting line attached to the recovery cap. The reservoir may expand as it fills with contaminants and as hydrostatic pressure decreases, with gas from the contaminants being vented off.

To put the invention into the context of the prior art, reference has already been made to FIGS. 1 and 2 of the accompanying drawings, in which.

In order that the invention may be more readily understood, reference will now be made, by way of example, to the remainder of the accompanying drawings, in which.

Figure 3:
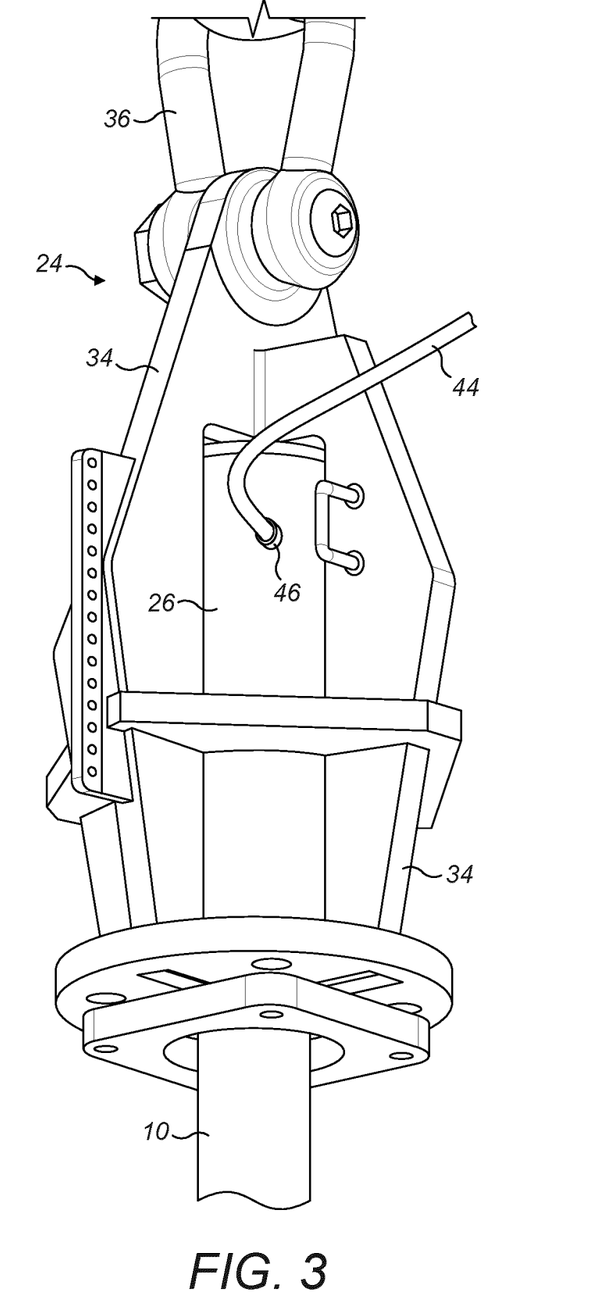
FIG. 3 is a perspective view of a recovery cap of the invention, fitted to an end portion of a flexible subsea pipeline.
Figure 4:
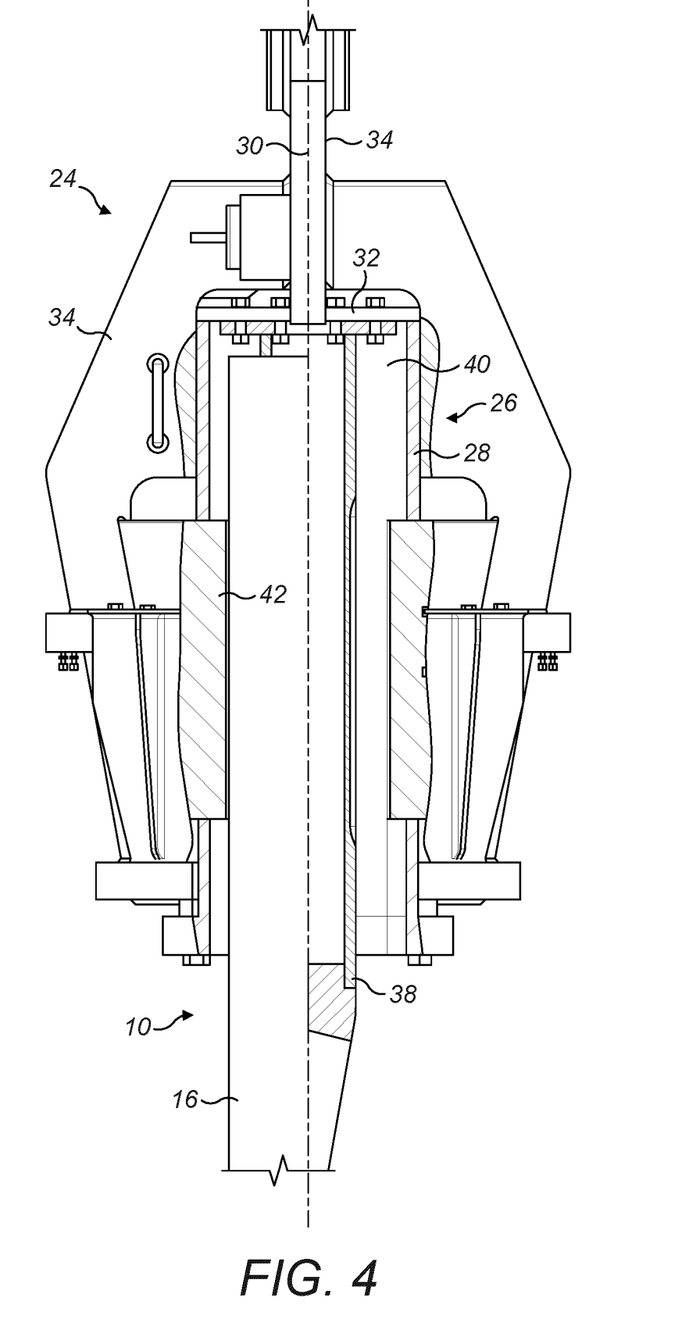
FIG. 4 is a side view of the recovery cap of FIG. 3, shown in central longitudinal section and with the pipeline partially cut away.

FIGS. 3 and 4 show a recovery cap 24 of the invention fixed to, and enclosing, an upper end of a subsea pipeline 10. In this example, the pipeline 10 is a flexible pipeline 10 although, in principle, the invention could be used on a rigid pipeline 10 instead.

The recovery cap 24 comprises a hollow cylindrical body 26. As best appreciated in FIG. 4, the body 26 comprises a tubular skirt or side wall 28 of circular cross section that is rotationally symmetrical about a central longitudinal axis 30. The upper end of the body 26 is closed by a top wall 32 at a proximal end at the side wall 28, in a plane orthogonal to the central longitudinal axis 30. Conversely, the lower end of the body 26 at a distal end of the side wall 28 is open.

The inner diameter of the body 26 is sufficient to receive and accommodate an end portion of the pipeline 10 within the body 26 in concentric, telescopic relation. Thus, the inner diameter of the side wall 28 is greater than the outer diameter of the pipeline 10. The remainder of the pipeline 10 protrudes downwardly from the open lower end of the body 26.

Externally, the body 26 is surrounded and supported by plates 34 that lie in mutually orthogonal planes intersecting along the central longitudinal axis 30. One of the plates 34 extends proximally beyond the top wall 32 of the body 26 to support a lifting formation 36, exemplified here by a pivoting shackle.

Internally, the body 26 contains a hollow spear tube 38 that extends distally from the top wall 32. The lower or distal end of the spear tube 38 is open. The spear tube 38 is concentric with, and spaced radially from, the surrounding side wall 28 of the body 26 to define an annular gap 40 between the spear tube 38 and the side wall 28. The outer diameter of the spear tube 38 is less than the inner diameter of the pipeline 10 so as to accommodate the wall of the pipeline 10 in the annular gap 40.

The annular gap 40 that surrounds the end portion of the pipeline 10 is in fluid communication with the interior of the pipeline 10 via the open end of the spear tube 38 and openings in the wall of the spear tube 38. Also, the upper end of the pipeline 10 within the recovery cap 24 is spaced from the top wall 32 of the body 26 as shown in FIG. 4. The annular gap 40 and the interior of the pipeline 10 together define a closed-topped chamber that contains the upper end of the pipeline 10.

To provide an interface between the recovery cap 24 and the pipeline 10, the body 26 also contains a clamp ring 42 that is extensible radially inwardly from the side wall 28 across the annular gap 40 toward the spear tube 38. When the clamp ring 42 is extended in this way, the tubular wall 16 of the pipeline 10 sandwiched between the side wall 28 and the spear tube 38 is clamped between the clamp ring 42 and the spear tube 38. This effects mechanical engagement between the recovery cap 24 and the pipeline 10, enabling the recovery cap 24 to lift the pipeline 10 from the seabed against tension arising from the suspended weight of the pipeline 10. For this purpose, the clamp ring 42 and/or the spear tube 38 may have resilient and/or ridged or toothed facing parts to improve gripping engagement with the pipeline 10.

Circumferentially, the clamp ring 42 may be interrupted into segments or shoes that can be driven inwardly by actuators or may instead be continuous, for example an inwardly-expandable toroid. In the latter case, the clamp ring 42 could seal around the outer surface of the pipeline 10, isolating the annular gap 40 and the interior of the pipeline 10 from the surrounding seawater. Alternatively, for the same purpose, a circumferential seal encircling the pipeline 10 may be provided in addition to a clamp ring 42. However, the design of the recovery cap 24 makes sealing inessential and hence optional, as will be explained below.

FIG. 3 shows a hose 44 extending from a port 46 at or near to the upper end of the body 26 of the recovery cap 24. In this example, the port 46 penetrates the side wall 28 of the body 26 whereby the hose 44 is in fluid communication with the interior of the body 26, particularly with the annular gap 40 that communicates with the interior of the pipeline 10 and that surrounds the end portion of the pipeline 10. In this way, the hose 44 can drain or evacuate hydrocarbon contaminants 14 that flow, leach or discharge from the pipeline 10 into the body 26 of the recovery cap 24, preventing those contaminants 14 accumulating in volume to the extent that they could leak from the open lower end of the body 26.

Figure 5:
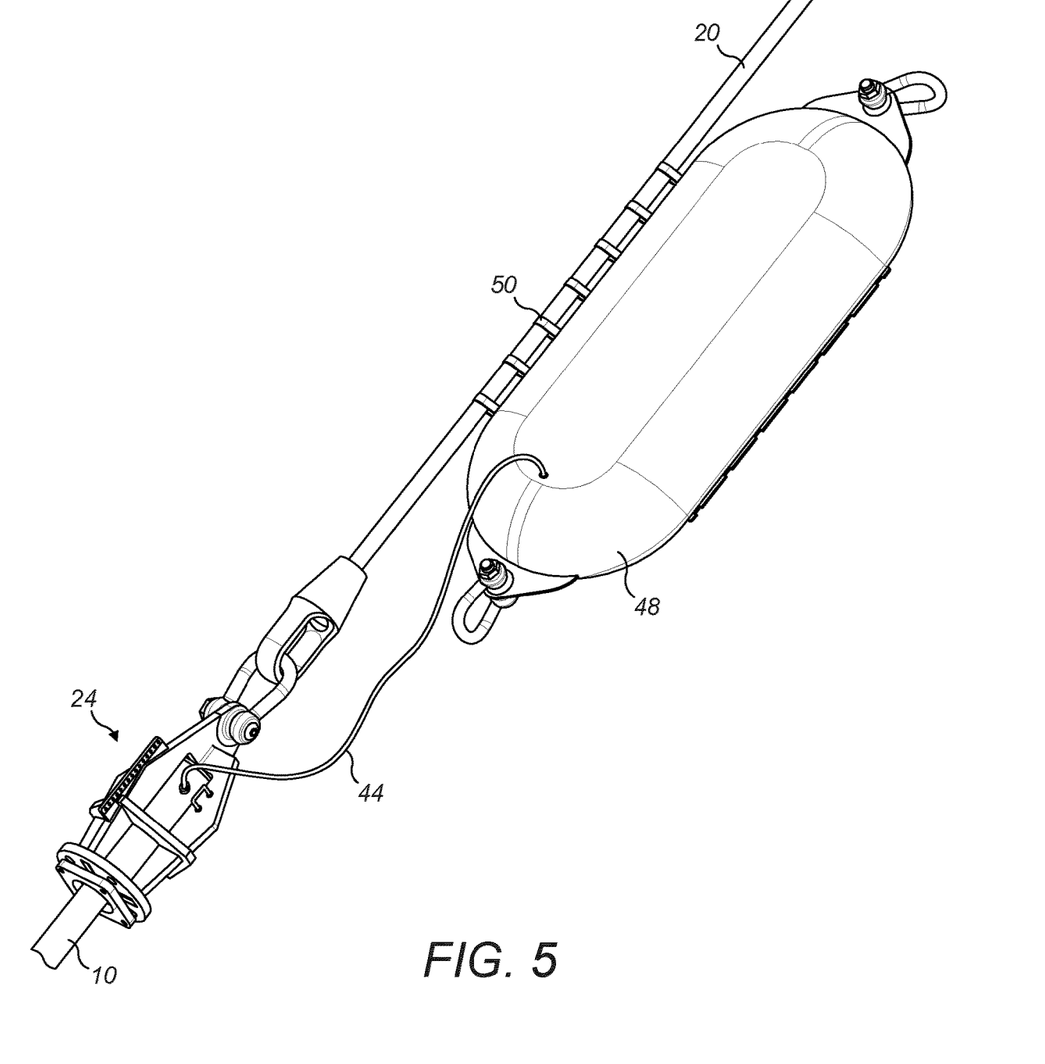
FIG. 5 is a perspective view of the recovery cap of FIGS. 3 and 4 in fluid communication with a subsea bladder for receiving contaminants flushed from the pipeline.

Thus, when the central longitudinal axis 30 of the recovery cap 24 is generally upright, albeit potentially inclined significantly away from the vertical as shown in FIG. 5, the body 26 of the recovery cap 24 captures and confines contaminants 14 that escape from the upper end of the pipeline 10. The hose 44 drains those contaminants 14 out of the body 26 and into a reservoir. Conveniently, the reservoir is positioned above the recovery cap 24 so that buoyancy of the contaminants 14 is sufficient to propel the contaminants 14 into the reservoir. In this respect, hydrocarbon contaminants 14 typically have a lower density or specific gravity than seawater. The flow of contaminants 14 into the reservoir may also be driven by overpressure in the pipeline 10 or the recovery cap 24, or by pumping from outside the recovery cap 24.

FIG. 5 shows the recovery cap 24 attached to the pipeline 10 and suspended underwater from an A&R wire 20 that hangs from a surface vessel, not shown. The reservoir is exemplified here as a flexible bladder 48 that is attached to the A&R wire 20 above the recovery cap 24, for example by a series of straps 50. The bladder 48 can expand as it fills with contaminants 14.

Figure 6:
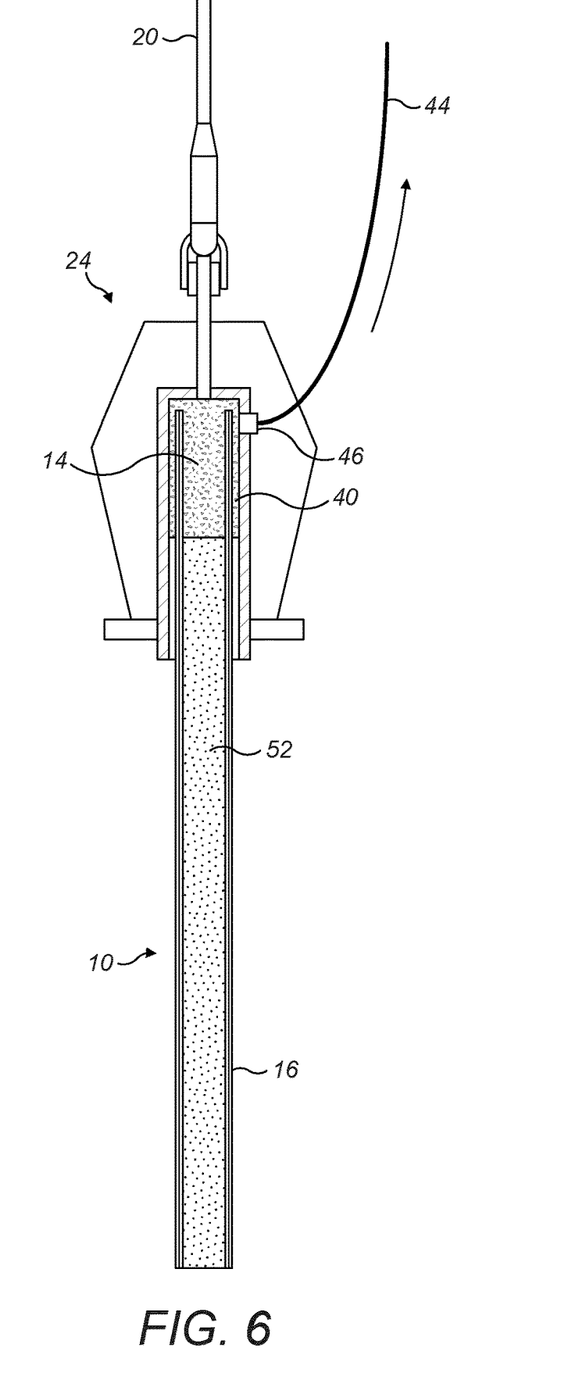
FIG. 6 is a schematic sectional side view of a pipeline like that of FIG. 1 fitted with a recovery cap of the invention and raised from the seabed in an upright orientation, showing contaminants floating on the column of water within the pipeline and confined by the recovery cap.
Figure 7:
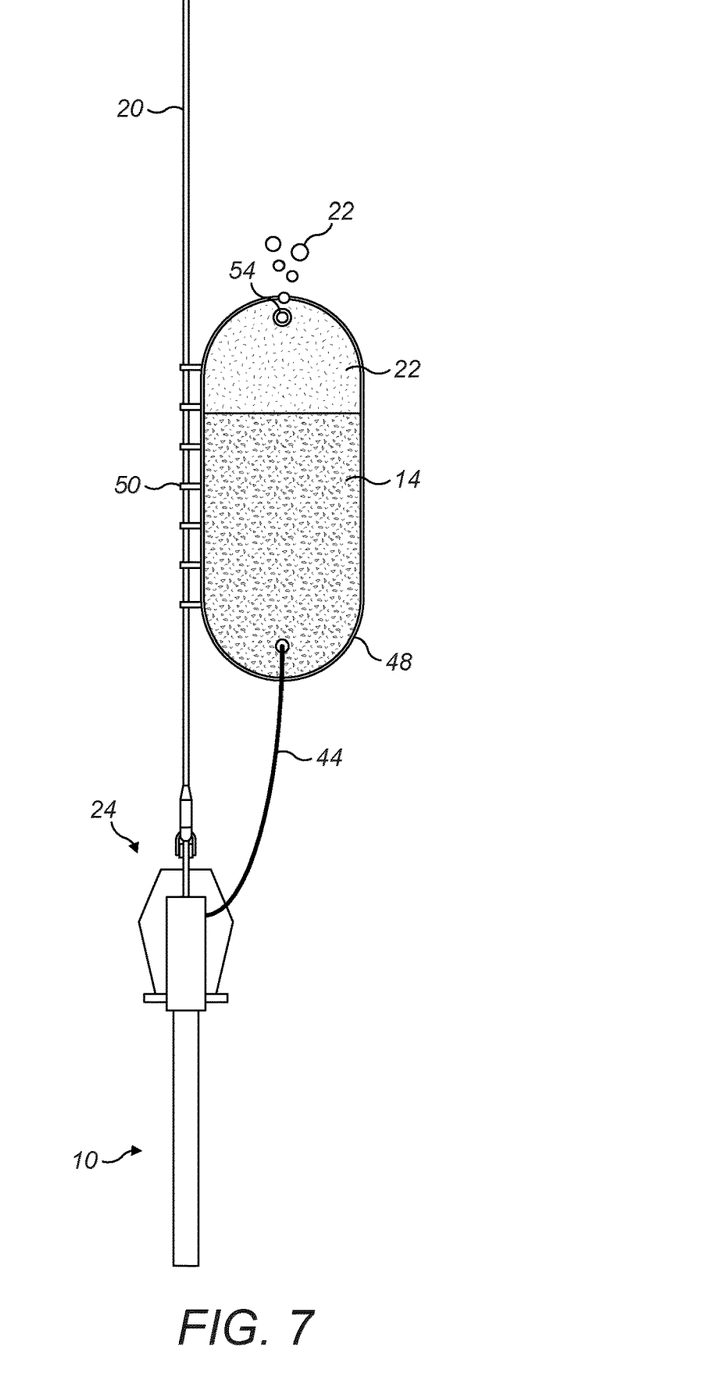
FIG. 7 corresponds to FIG. 6 but shows contaminants transferred from the recovery cap to a subsea bladder as shown in FIG. 6.
Figure 8:
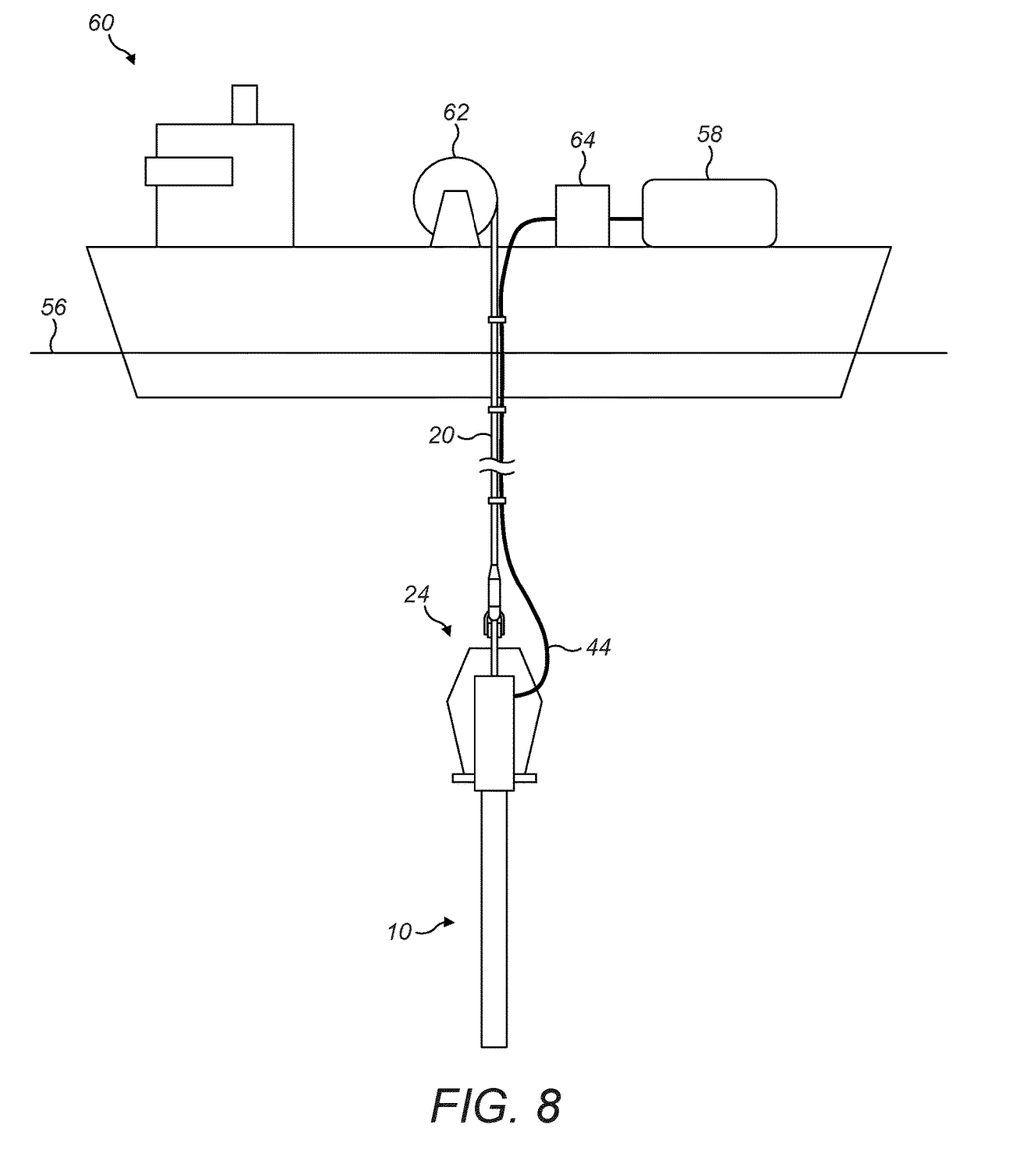
FIG. 8 corresponds to FIG. 7 but shows a variant of the invention in which contaminants are transferred from the recovery cap to a holding tank above the surface.

FIGS. 6 to 8 are schematic drawings that illustrate the operation and benefits of the invention in comparison with the prior art shown in FIGS. 1 and 2. In each case, the upper end portion of the pipeline 10 has been lifted from the seabed suspended from an A&R wire 20 via a recovery cap 24 clamped to the pipeline 10.

FIG. 6 shows the recovery cap 24 in a simplified form that omits the clamp ring 42 and the spear tube 38 for clarity of illustration. Here, it will be apparent that positively-buoyant hydrocarbon contaminants 14 flushed from the pipeline 10 and from between the layers of the pipeline wall 16 are held within the body 26 of the recovery cap 24, where they float on top of the column of seawater 52 within the pipeline 10. Thus, there is downward displacement of the column of seawater 52, and similarly of the seawater surrounding the pipeline 10, by virtue of the buoyant accumulation of the contaminants 14 within the body 26.

The floating contaminants 14 are confined within the closed-topped chamber that contains the upper end of the pipeline 10, which chamber is defined by the interior of the pipeline 10 and by the annular gap 40 that surrounds the pipeline 10 as explained above. The column of seawater 52 within the pipeline 10 cooperates with the seawater surrounding the pipeline 10 to confine the contaminants 14 to that chamber. The aforementioned optional sealing provisions between the side wall 28 of the body 26 and the outer surface of the pipeline 10 may also contribute to confining the contaminants 14 within that chamber.

To ensure that the volume of the contaminants 14 cannot build up to the extent that they could spill out of the open bottom of the body 26, the contaminants 14 are tapped off from the body 26 continuously or periodically to a reservoir via the port 46 and the hose 44 as shown by the arrow in FIG. 6.

FIG. 7 shows a reservoir in the form of a flexible bladder 48 like that of FIG. 5, to exemplify how a reservoir may be positioned underwater to receive contaminants 14 removed from the body 26 of the recovery cap 24. Conveniently, the bladder 48 is lifted to the surface attached to the A&R wire 20 as part of the same operation that lifts the pipeline 10 from the seabed to the surface vessel. The bladder 48 can then be emptied into a tank aboard the surface vessel or at a treatment facility that receives and processes the contaminants 14.

The bladder 48 is fitted with a vent 54 whereby gas 22 rising from liquid contaminants 14 in the bladder 48 can be vented off into the surrounding seawater as the bladder 48 is filled. Venting of gas 22 is also necessary as the bladder 48 is lifted toward the surface vessel together with the recovery cap 24 and the pipeline 10, thus experiencing a progressive reduction in hydrostatic pressure as the bladder 48 rises through the water column. Unlike the gas 22, the liquid contaminants 14 that remain within the bladder 48 are not susceptible to change substantially in volume with changes in hydrostatic pressure.

The vent 54 suitably has a one-way valve to ensure that gas 22 can be expelled through the vent 54 but that seawater cannot enter the bladder 48 through the vent 54. The bladder 48 may also be equipped with a separation system to ensure that liquid contaminants 14 cannot escape through the vent 54 with the escaping gas 22.

Turning finally to the variant shown in FIG. 8, this exemplifies how a reservoir could instead be positioned above the surface 56 of the sea to receive contaminants 14 removed from the body 26 of the recovery cap 24. In this example, the reservoir is a tank 58 aboard a surface vessel 60, preferably the same vessel that lifts the pipeline 10 using an A&R winch 62 that winds in the A&R wire 20. FIG. 8 also shows the option of a pump 64, in this example also aboard the surface vessel 60, that draws contaminants 14 out of the recovery cap 24 and into the tank 58. Conveniently, the hose 44 may be attached to the A&R wire 20 as shown but the hose 44 could instead hang freely in the water between the vessel 60 and the recovery cap 24.

The invention claimed is:

1. A method of recovering a used pipeline from an underwater location to the surface of a body of water, the method comprising comprises: at the underwater location, attaching a recovery cap to the pipeline to surround an end of the pipeline; upending at least an end portion of the pipeline underwater with the recovery cap on top; and, while lifting the upended pipeline toward the surface, capturing within the recovery cap hydrocarbon contaminants rising from the pipeline; and conveying the captured contaminants from the recovery cap to a reservoir; wherein the reservoir is external to the recover cap and supported on a lifting wire attached to the recovery cap.

2. The method of claim 1, comprising suspending at least the end portion of the pipeline from the recovery cap.

3. The method of claim 1, comprising conveying the captured contaminants to the reservoir when the reservoir is underwater.

4. The method of claim 3, comprising expanding the reservoir while lifting the upended pipeline toward the surface.

5. The method of claim 3, comprising lifting the reservoir toward the surface with the pipeline.

6. The method of claim 1, comprising conveying the captured contaminants to the reservoir when the reservoir is at or above the surface.

7. The method of claim 1, comprising venting gas from the reservoir while lifting the pipeline toward the surface.

8. The method of claim 1, comprising propelling the captured contaminants from the recovery cap to the reservoir by virtue of positive buoyancy of the contaminants relative to the water.

9. The method of claim 1, comprising pumping the captured contaminants from the recovery cap to the reservoir.

10. The method of claim 1, comprising floating the captured contaminants within the recovery cap on water within the pipeline.

11. The method of claim 1, comprising floating the captured contaminants within the recovery cap on water surrounding the pipeline.

12. The method of claim 1, comprising sealing between the recovery cap and the pipeline to define a sealed chamber around the end of the pipeline and confining the captured contaminants to that chamber.

13. The method of claim 1, comprising flooding the pipeline with water from an end of the pipeline opposed to the end fitted with the recovery cap.

14. The method of claim 1, wherein the reservoir is spaced from the recovery cap.

15. The method of claim 1, wherein the pipeline has a layered wall.

16. The method of claim 15, wherein the pipeline is an unbonded flexible pipeline.

17. A recovery cap for recovering a pipeline from an underwater location to the surface of a body of water, the recovery cap comprises a hollow body; an attachment interface for coupling the body to an end of the pipeline; at least one port for extracting hydrocarbon contaminants from the body when an end portion of the pipeline is upended; a reservoir in fluid communication with the recovery cap, and wherein the reservoir is external to the recover cap and supported on a lifting wire attached to the recovery cap.

18. The recovery cap of claim 17, further comprising a lifting interface for the lifting line.

19. The recovery cap of claim 17, wherein the attachment interface comprises a clamp ring that is movable radially inwardly from a side wall of the body.

20. The recovery cap of claim 17, wherein the port is positioned in an upper portion of the body.

21. The recovery cap of claim 17, wherein the body has an open bottom and a closed top.

22. The recovery cap of claim 17, further comprising a circumferential seal encircling an inner surface of the body.

23. A pipeline recovery system, comprising: the recovery cap of claim 17.

24. The system of claim 23, wherein the reservoir is spaced apart from the recovery cap and is in fluid communication with the recovery cap via an elongate conduit.

25. The system of claim 23, wherein the reservoir comprises a submersible tank.

26. The system of claim 25, wherein the submersible tank is expansible or pressure-compensated.

27. The system of claim 25, wherein the submersible tank comprises a gas vent.

28. The system of claim 25, wherein the submersible tank is attached to a lifting wire that is also attached to the recovery cap.

29. The system of claim 23, wherein the reservoir comprises an above surface tank.

30. The system of claim 23, further comprising a pump for pumping the contaminants from the recovery cap to the reservoir.

* * * * *